United States Patent
Park

(10) Patent No.: US 6,982,621 B2
(45) Date of Patent: Jan. 3, 2006

(54) METHOD AND APPARATUS FOR SUBSTANTIALLY REDUCING ELECTRICAL DISPLACEMENT CURRENT FLOW BETWEEN INPUT AND OUTPUT WINDINGS OF AN ENERGY TRANSFER ELEMENT

(75) Inventor: Chan Woong Park, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 10/405,373

(22) Filed: Apr. 1, 2003

(65) Prior Publication Data
US 2004/0196668 A1 Oct. 7, 2004

(51) Int. Cl.
*H01F 27/02* (2006.01)

(52) U.S. Cl. .................................. 336/84 C; 336/84 R
(58) Field of Classification Search ............... 336/69, 336/84 R, 84 C, 180–183, 220–221; 323/355–358
See application file for complete search history.

(56) References Cited

U.S. PATENT DOCUMENTS 2,553,324 A * 5/1951 Lord ........................... 336/73
3,299,384 A * 1/1967 Lee ............................ 336/171
4,518,941 A * 5/1985 Harada ......................... 336/69
5,150,046 A * 9/1992 Lim ............................ 323/356

FOREIGN PATENT DOCUMENTS

| JP | 60-226112 | * 11/1985 |
| JP | 04-282806 | * 10/1992 |
| JP | 10-052036 | * 2/1998 |
| JP | 11-186068 | * 7/1999 |

* cited by examiner

Primary Examiner—Tuyen T Nguyen
(74) Attorney, Agent, or Firm—Blakely Sokoloff Taylor & Zafman LLP

(57) ABSTRACT

An energy transfer element with substantially reduced electrical displacement current flow between an input circuit coupled to the energy transfer element input winding and an output circuit coupled to the energy transfer element output winding. In one aspect, an energy transfer element includes an input winding, an output winding, an electrically conductive shield coupled to the input winding and a first cancellation winding coupled to the input winding. The electrically conductive shield is physically positioned between input and output windings. The output winding is physically positioned between the electrically conductive shield and the first cancellation winding. The first cancellation winding is wound to substantially reduce a capacitive displacement current between the input circuit and the output circuit.

9 Claims, 7 Drawing Sheets

TRANSFORMER CONSTRUCTION

METHOD AND APPARATUS FOR SUBSTANTIALLY REDUCING ELECTRICAL DISPLACEMENT CURRENT FLOW BETWEEN INPUT AND OUTPUT WINDINGS OF AN ENERGY TRANSFER ELEMENT

BACKGROUND OF THE INVENTION

1. Field of the Invention

The present invention relates generally to energy transfer elements and, more specifically, the present invention relates to energy transfer elements having at least 3 windings and electrically conductive shields.

2. Background Information

FIG. 1 shows an outline schematic diagram of a flyback converter power supply 101. The basic operation of the flyback converter 101 power supply is well documented and known to one skilled in the art. The primary (or input) circuit comprising primary switch 103 is controlled through a feedback control signal 105, typically but not necessarily from the secondary (or output) circuit of the power supply as shown. The energy transfer element, or transformer 107, which for the purpose of this description is shown having only 2 windings, uses a winding dot polarity that indicates the phase relationship of the winding voltages. During voltage transitions across the windings, the dot end of the windings are in phase.

FIG. 2 is a schematic of a power supply 201, which expands on the outline schematic of FIG. 1 by representing the parasitic capacitances 209 that exist between the transformer body, core or structure (energy transfer element) and electrical earth, the parasitic capacitances 211 that exist between the input and output windings and the transformer body (core) and also the parasitic capacitances 213 that exist between the input and output windings of the transformer. Usually the transformer core is the ferrite core used in the transformer construction to provide a low reluctance path for the magnetic flux coupling input and output windings of the transformer 207. As noted in FIG. 2, the parasitic capacitance 215 between the output of the transformer and electrical earth in some embodiments maybe short circuited depending on the application and or the way in which the electrical noise measurements are made.

During the normal operation of the power supply 201, the voltages across both input and output windings of the transformer 207 transition in accordance with the standard flyback converter power supply operation. These transitions generate displacement currents in the various parasitic capacitances 209, 211, 213 and 215 shown. These displacement currents are detected as common mode noise (or emissions) and measured by a piece of test equipment called a Line Input Stabilization Network (LISN). The configuration and connection of this equipment is well documented and known to one skilled in the art.

FIG. 2 also highlights capacitor Cy 217, which is a Y-capacitor that is commonly used in switching power supplies to reduce the common mode emissions. This component, capacitor Cy 217, provides a low impedance path for displacement currents flowing between input and output circuits of the flyback converter 201, to return to their source without flowing through electrical earth. The currents in capacitor Cy 217 are not detected by the LISN and its use therefore acts to reduce common mode emissions.

BRIEF DESCRIPTION OF THE DRAWINGS

The present invention detailed illustrated by way of example and not limitation in the accompanying figures.

DETAILED DESCRIPTION

Figure 1:
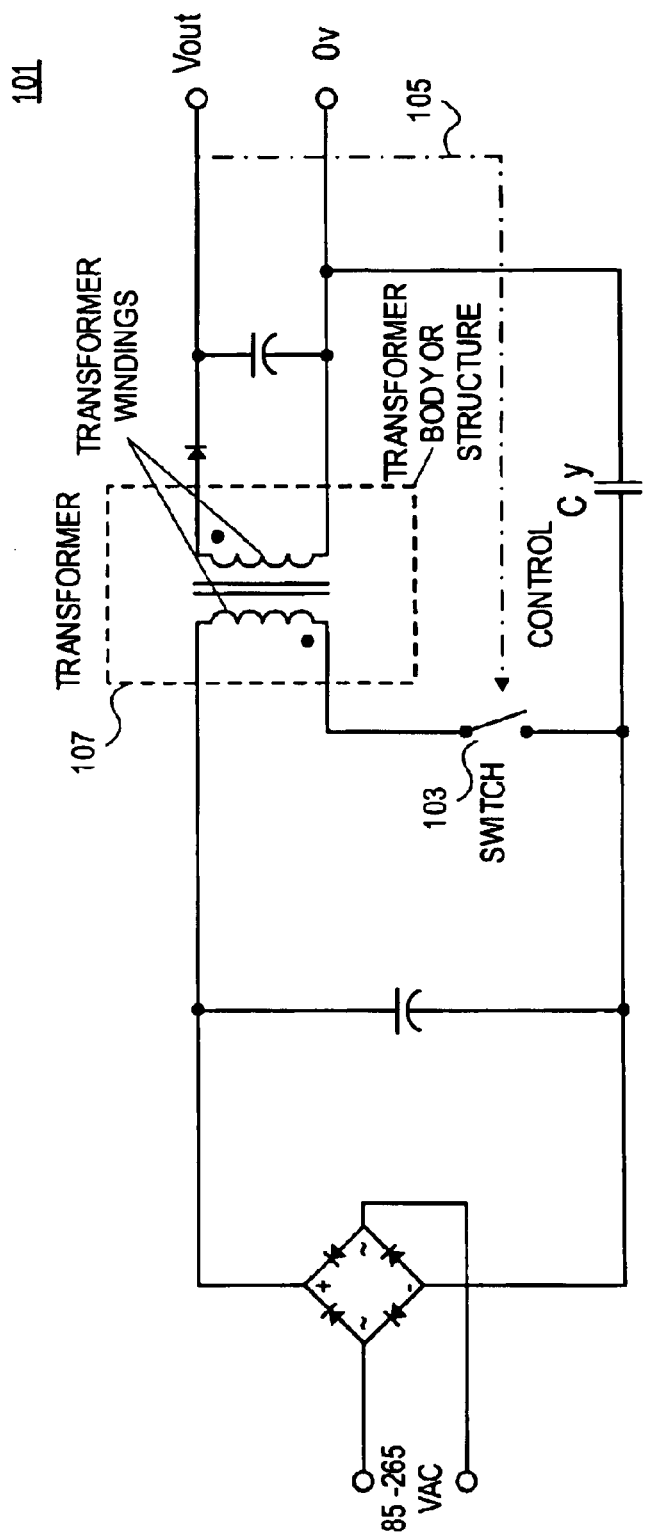
FIG. 1 is a schematic diagram of a flyback converter power supply.
Figure 2:
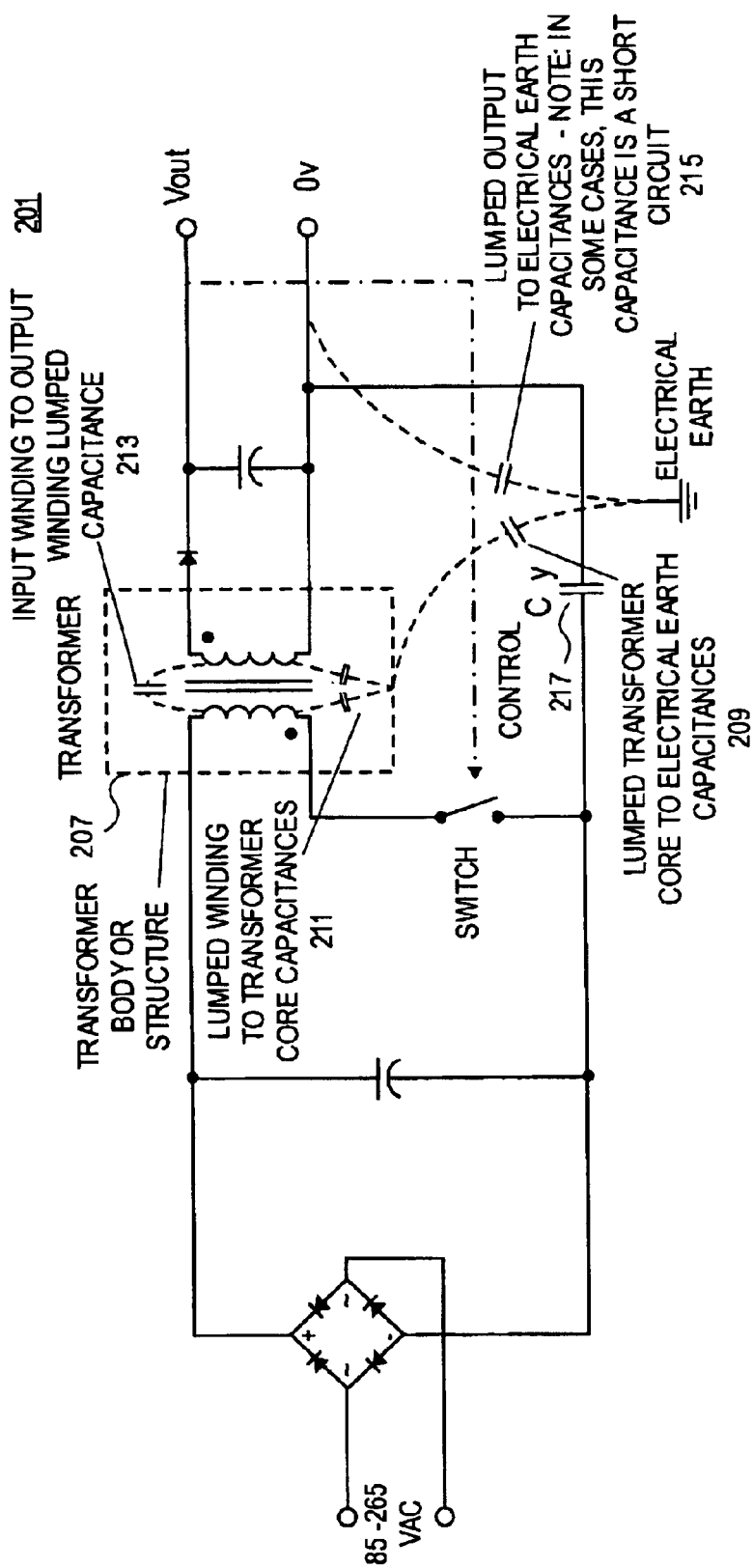
FIG. 2 is a schematic diagram of a flyback converter power supply showing parasitic capacitances.

Embodiments of methods and apparatuses for reducing capacitive displacement current flow generated by wound components are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Causes of electrical noise generated by switching power supply circuits are well documented and known to those skilled in the art. Embodiments of the present invention are directed to the reduction in common mode noise generated by the energy transfer element, and more specifically the capacitive displacement current flowing between input and output windings of the energy transfer element, commonly referred to as the power supply transformer, during the operation of a switching power supply.

Since these techniques according to embodiments of the present invention can be applied to flyback and forward converter power supplies, it is appreciated that one may refer to the transformer as the energy transfer element. However in the specific embodiment discussed here, a flyback circuit example is discussed and the energy transfer element is referred to as a transformer. Furthermore, input and output windings of energy transfer elements maybe referred to as primary and secondary windings respectively as will be familiar to one skilled in the art. Furthermore, input and output circuits coupled to the input and output windings of energy transfer elements maybe referred to as primary and secondary circuits respectively as will be familiar to one skilled in the art.

Various embodiments of the present invention described herein provide techniques that are used in the construction of a transformer to substantially reduce the net capacitive displacement currents flowing between input and output circuits coupled to transformer input and output windings, allowing the system cost to be reduced either by eliminating the requirement to use a Y-capacitor or by reducing the value of Y capacitor that is necessary. Reducing the value of or eliminating the Y capacitor also reduces leakage currents between the safety isolated output and the AC input line. This is advantageous in applications where the output can come in contact with the user such as for example but not limited to cellular phone applications or the like.

In particular, various embodiments of the techniques described herein substantially reduce the capacitive displacement currents that normally flow in a switching power supply between the primary and secondary, or input and output, circuits. In one embodiment, the reduction is achieved by adding a cancellation winding to a transformer construction that already uses a conductive shield between input and output windings. Shields of this type are commonly used to reduce capacitive displacement currents between input and output windings, however the use of a shield alone does not cancel all capacitive displacement currents as will be described, leading to additional measures typically external to the transformer itself to reduce net capacitive displacement currents to within acceptable limits. Various embodiments of the present invention therefore reduce system cost by eliminating certain power supply components or additional transformer shields that would otherwise be necessary to a designer not having the benefit of this disclosure.

As an overview, displacement currents generated by the operation of a switching power supply and flowing to electrical earth, are measured as electrical noise, also known as common mode emissions, that can cause electromagnetic interference (EMI) which influences other equipment. It is therefore necessary to maintain these currents below published limits set up by regulatory bodies globally. Transformers in switching power supplies generate displacement current flow to electrical earth in two ways.

One of the ways is the flow of displacement current between the core of the transformer and electrical earth. This current is generated by voltage transitions on the transformer windings coupling capacitively to the core of transformer. This current then typically flows capacitively through free space between the core of the transformer and electrical earth.

The other way is the flow of displacement current between the primary and secondary windings of the transformer, which are set up by differential voltages between these windings. Differential voltages between these windings generate current flow in the inter-winding capacitance. This displacement current will return to its source through parallel paths one of which is electrical earth.

Various embodiments of the present invention describe ways of reducing net displacement current flow between input and output circuits coupled to transformer input and output windings using an additional cancellation winding. In addition, various embodiments describe ways of employing other techniques in combination with embodiments of the present invention to further cancel displacement currents between the input winding and transformer core. In one embodiment, the design of these cancellation windings is specific to a particular transformer both in terms of the number of winding layers, turns used and their physical positioning. Through use of these techniques, the net displacement current flow between the transformer windings is substantially reduced. This in turn eliminates or reduces the cost of external components such as Y capacitors that are used to reduce common mode emissions.

Figure 3:
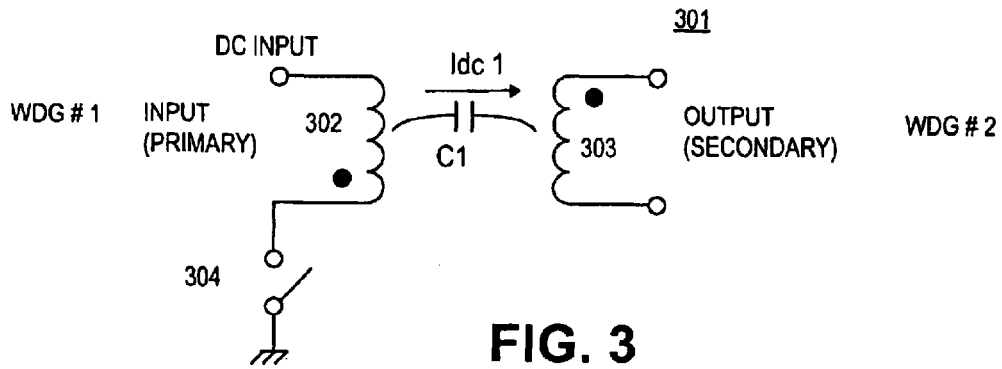
FIG. 3 is a schematic diagram of a transformer.

To illustrate, FIG. 3 shows a simple outline schematic of a two winding transformer 301. The voltage transitions due to the switching of switch 304 on the input (primary) 302 and output (secondary) 303 windings leads to displacement current flow Idc1 as shown in parasitic inter-winding capacitance C1. Typically the direction of current flow is from primary to secondary since the voltages present on the primary winding 302 during switching are normally higher than those present on the secondary winding 303.

Figure 4:
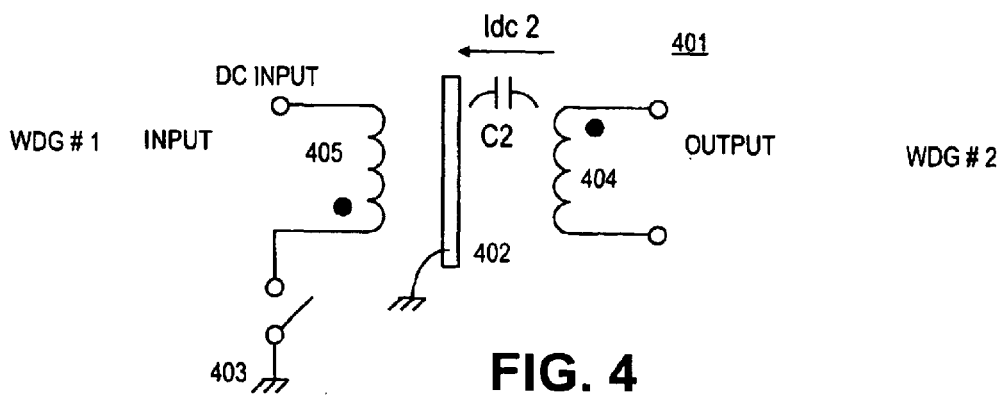
FIG. 4 is a schematic diagram of a transformer including an electrically conductive shield.

FIG. 4 shows the schematic of one regularly employed way of reducing the magnitude of the displacement current Idc1 in FIG. 1. If an electrically conductive shield (often made of copper) is positioned between primary and secondary windings, the flow of current from primary to secondary winding is prevented as the displacement currents generated by the primary winding 405 voltage transitions are shorted to primary ground potential 403 and do not flow to the output winding 404.

However, in this case, the fact that the electrically conductive shield 402 is shorted to primary ground, means that a displacement current Idc2, due to the voltage transitions across output winding 404, does flow from output to input ground. The electrically conductive shield 402 therefore has limited benefit since although it substantially reduces displacement current flowing between the primary and secondary windings, it gives rise to a secondary to primary displacement current through the electrically conductive shield which is coupled to the primary ground potential 403. This current is detected as common mode noise by EMI test equipment. This often leads to very complex transformer constructions involving a second electrically conductive shield connected to output ground and positioned between the output winding and the primary electrically conductive shield, which increases leakage inductance between input and output windings and increases switching losses due to increased capacitive currents circulating between input windings and the input shield and output winding and the output shield. These issues will be familiar to one skilled in the art and are therefore not described here in detail.

Figure 5:
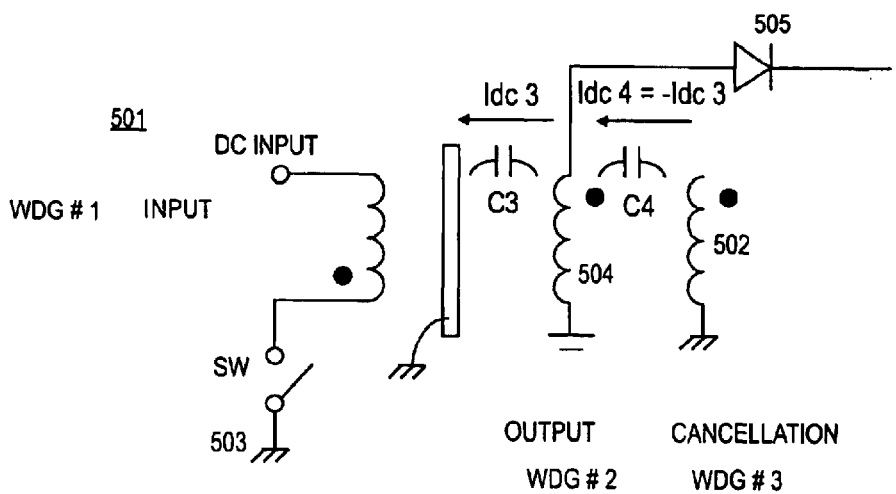
FIG. 5 is a schematic diagram of one embodiment of a transformer wound in accordance with the teachings of the present invention.

In contrast, FIG. 5 shows one embodiment a schematic of a transformer 501 in accordance with the teachings of the present invention. Compared to the schematic shown in FIG. 4, a cancellation winding 502 has been introduced, which is coupled to input ground 503. The cancellation winding 502 is physically positioned within the transformer construction close to output winding 504 and therefore couples displacement current Idc4 through inter-winding capacitance C4. If the displacement current Idc4, which flows from the cancellation winding to the output winding, exactly matches the displacement current Idc3, which flows from the output winding 504 to the primary ground 503 through the electrically conductive shield, the net displacement current is zero. In this way, embodiments according to the teachings of the present invention provide a way to substantially offset or reduce the net displacement current between input and output circuits without the need to introduce further electrically conductive shields with the consequent performance disadvantages described above.

In practice, the exact number of turns chosen for the cancellation winding 502 in FIG. 5 for example, relative to the output winding 504 is chosen using empirical methods to determine the optimum cancellation that minimizes the measured EMI.

Figure 6:
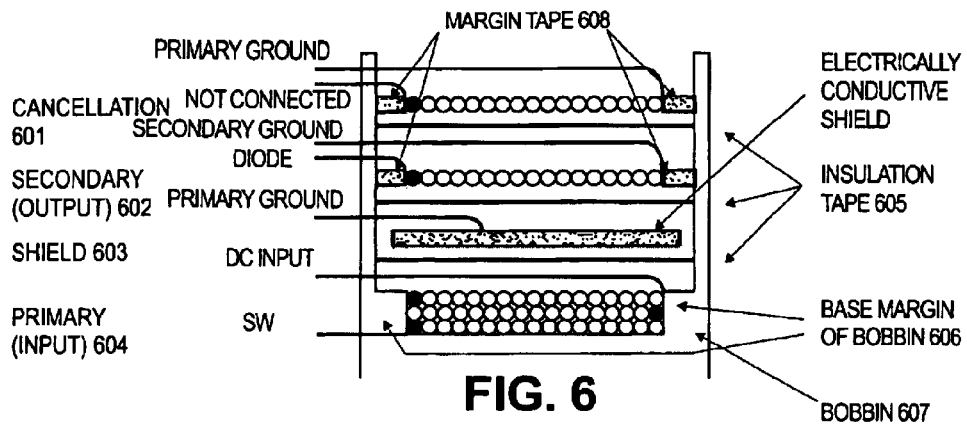
FIG. 6 is a cross section of one embodiment of a transformer wound in accordance with the teachings of the present invention.

FIG. 6 shows the cross section of one embodiment of a transformer in accordance with the teachings of the present invention. The bobbin 607 is a former upon which the windings are mounted and which separates the windings from the core (typically ferrite in switching transformers) of the transformer as will be familiar to one skilled in the art. The bobbin 607 in the design shown has two small steps or margins as labeled 606 at the base of the bobbin 607. This reduces the winding area width for the first winding, in this embodiment the input winding 604. The subsequent placement of shield 603 is then sure to overlap the width of the primary winding 604, to help prevent any displacement current coupling between the input winding 604 and the output winding 602. To further reduce the displacement current flowing directly between input and output windings, the output winding 602 is also wound between margins constructed of tape 608. Finally the cancellation winding 601 is positioned outside the output winding 602.

It is appreciated that the number of conductors shown in each winding is a representation only and should not be regarded as representative of the actual number of turns in any one winding. In fact, to a first order, if the physical separation between output winding 602 and shield 603 is equal to the physical separation between the cancellation winding 601 and the secondary winding 602, the number of cancellation turns required to provide optimum cancellation is approximately double that of the output winding 602. This can be explained by the fact that the dot polarity of both output 602 and cancellation 601 windings is the same as can be seen from the dot marking on the windings of FIG. 6. Hence, if the number of cancellation winding 601 turns were equal to the number of output turns 602, these windings would have the same magnitude voltage transitions and hence, to a first order, zero displacement current would flow between the cancellation winding 601 and output winding 602. However, from the discussion of FIG. 5 above, it is necessary to generate a displacement current between cancellation 601 and output 602 windings, equal to that flowing between output winding 602 and shield 603. Hence the requirement for the cancellation turns to be roughly double that of the output winding.

It is noted that the ratios can be varied as required according to embodiments of the present invention by increasing or decreasing the physical separation of each winding by choice of the number of turns of insulation tape 605 between the various windings. In one embodiment, the insulation tape 605 thicknesses between primary shield 603 and output winding 602 are determined as appropriate for the isolation required in a specific circuit application.

Figure 7:
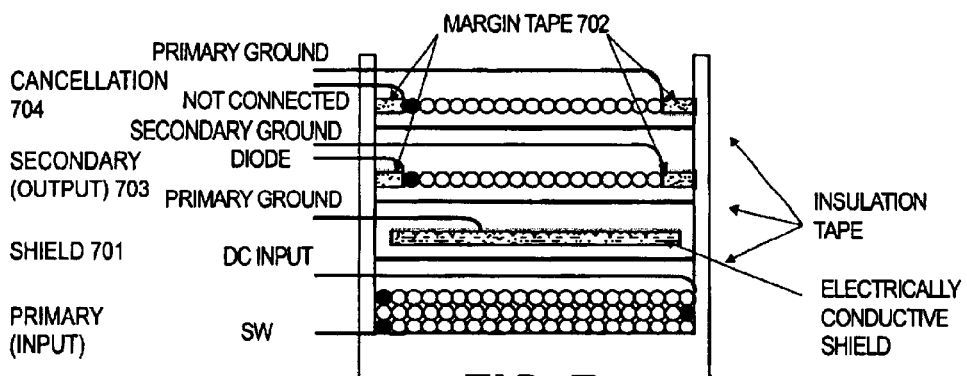
FIG. 7 is a schematic diagram of another embodiment of a transformer wound in accordance with the teachings of the present invention.

FIG. 7 shows the cross section of another embodiment of a transformer in accordance with the teachings of the present invention. The difference between this and the cross section shown in FIG. 6 is relatively subtle in that the margins at the base of the bobbin 606 in FIG. 6 have been removed. There is no other difference between this construction of this embodiment and that shown in FIG. 6. One practical aspect of the construction of this embodiment will be the requirement to carefully choose the width of the copper shield 701 to minimize any space at the edges of the shield which could allow a degree of displacement current to be coupled directly between input and output windings. However, the use of margin tape 702 to reduce the winding width for output 703 and cancellation 704 windings help reduce the risk of input to output winding displacement current flow.

Figure 8:
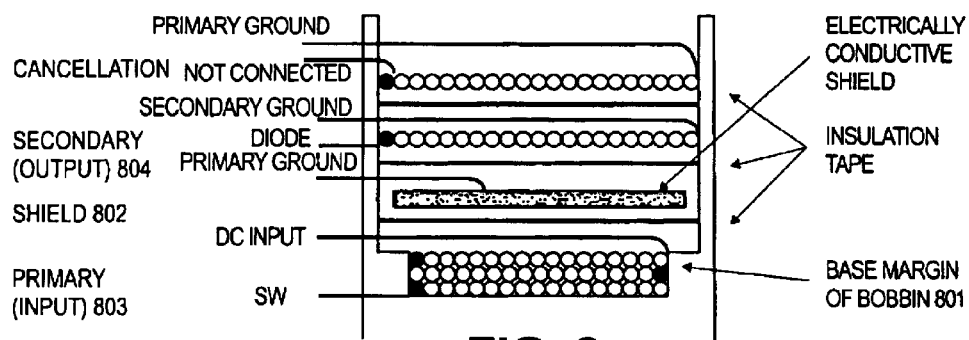
FIG. 8 is a schematic diagram of another embodiment of a transformer wound in accordance with the teachings of the present invention.

FIG. 8 shows the cross section of another embodiment of a transformer in accordance with the teachings of the present invention. Here the margin tape 702 in FIG. 7 has been removed and the margins at the base of the bobbin 801 have been reintroduced. In this embodiment, a careful determination is made in the choice of shield 802 width to reduce or minimize the displacement current directly between input 803 and output 804 windings.

Figure 9:
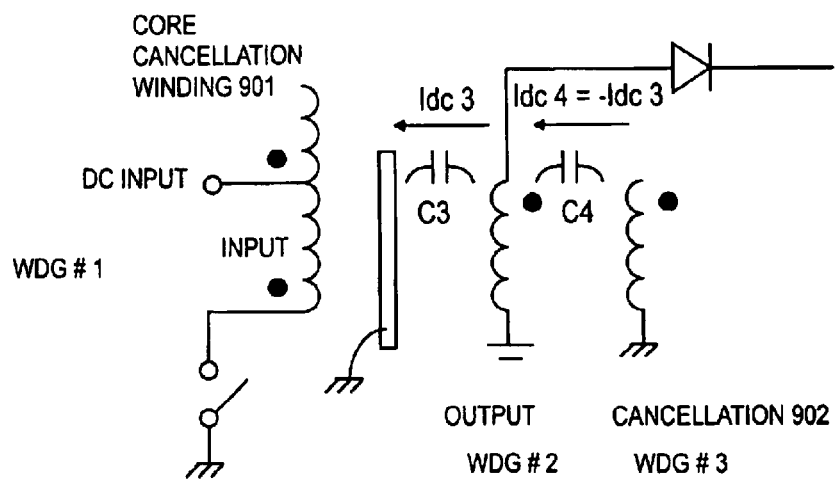
FIG. 9 is a schematic diagram of yet another embodiment of a transformer wound in accordance with the teachings of the present invention.

FIG. 9 shows a schematic of another embodiment of a transformer in accordance with the teachings of the present invention. The theory and operation of the cancellation winding 902 is identical to the descriptions above. However, in this embodiment, a second cancellation winding, the core cancellation winding 901 is introduced. This core cancellation winding 901 provides cancellation of displacement currents flowing between the primary winding and the transformer core, normally made of ferrite material. In one embodiment, the dot polarity of the core cancellation winding 901 is such that its electrostatic field opposes that created by the primary winding. In one embodiment, the net effect is that the influence of the electrostatic field produced by the other windings in the transformer construction relative to the transformer core are cancelled by the electrostatic field created by the core cancellation winding 901. Consequently the displacement current between transformer windings and transformer core is theoretically zero if the electrostatic fields perfectly cancel. In practice, the effect is to substantially reduce the net displacement current. Thus, the core cancellation winding 901 in one embodiment is wound to substantially reduce a capacitive displacement current flowing between the input winding and the energy transfer element core. In one embodiment, the core cancellation winding 901 and the cancellation winding 902 are therefore wound to substantially reduce a total or net displacement current flowing between the energy transfer element and electrical earth.

Figure 10:
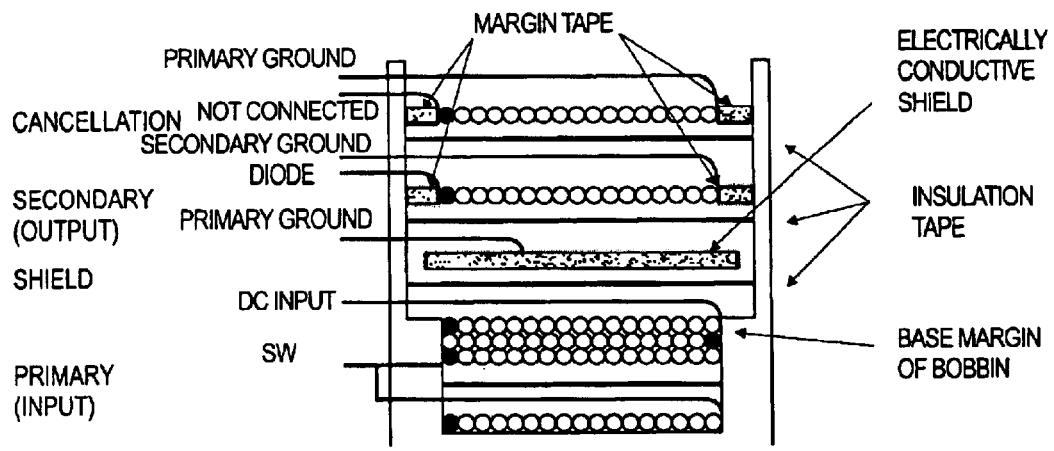
FIG. 10 is a cross section of yet another embodiment of a transformer wound in accordance with the teachings of the present invention.
Figure 11:
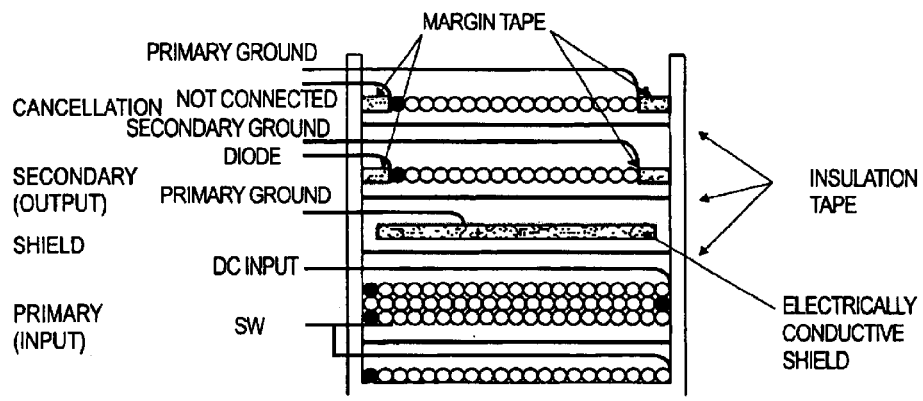
FIG. 11 is a cross section of yet another embodiment of a transformer wound in accordance with the teachings of the present invention.
Figure 12:
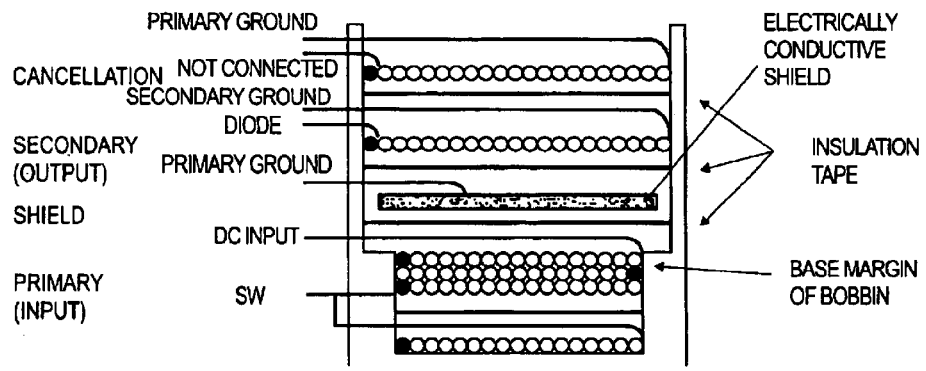
FIG. 12 is a cross section of yet another embodiment of a transformer wound in accordance with the teachings of the present invention.

FIGS. 10, 11 and 12 show the same variants of the construction as FIGS. 6, 7 and 8, except each of FIGS. 10, 11 and 12 incorporate the core cancellation winding 901 introduced in FIG. 9. Therefore, the embodiment of FIG. 10 illustrates the transformer bobbin including two small steps or margins at the base of the bobbin, which reduces the winding area width for the first winding and the core cancellation winding. The subsequent placement of the shield is then sure to overlap the width the primary winding and core cancellation winding to help prevent displacement currents coupling between the primary winding and the output winding. To further reduce the displacement current directly between input and output windings, the output winding is also wound between margins constructed of margin tape. Finally the cancellation winding is positioned outside the output winding.

The embodiment of FIG. 11 is similar to the embodiment of FIG. 10 with a difference being that two small steps or margins at the base of the bobbin in FIG. 10 have been removed.

In the embodiment illustrated in FIG. 12, the margin tape illustrated in the embodiment of FIG. 11 has been removed and the two small steps or margins at the base of the bobbin have been reintroduced.

In many practical energy transfer element designs, there is more than one output winding to support different output voltages as required by the specific application. In these multiple output designs, the layer of the output winding wound closest to the outside of the bobbin cross-section would be positioned next to the cancellation winding according to embodiments in accordance with the teachings of the present invention. In one embodiment, the number of cancellation winding turns are chosen appropriately to cancel the displacement currents from all output windings to the conductive shield positioned between the input winding and the various output windings.

Another advantage of transformer constructions in accordance with the teachings of the present invention is the ability to use the cancellation winding 502 in FIG. 5 for example, as a bias winding to provide low voltage supply to control circuitry on the input side of the power supply.

Figure 13:
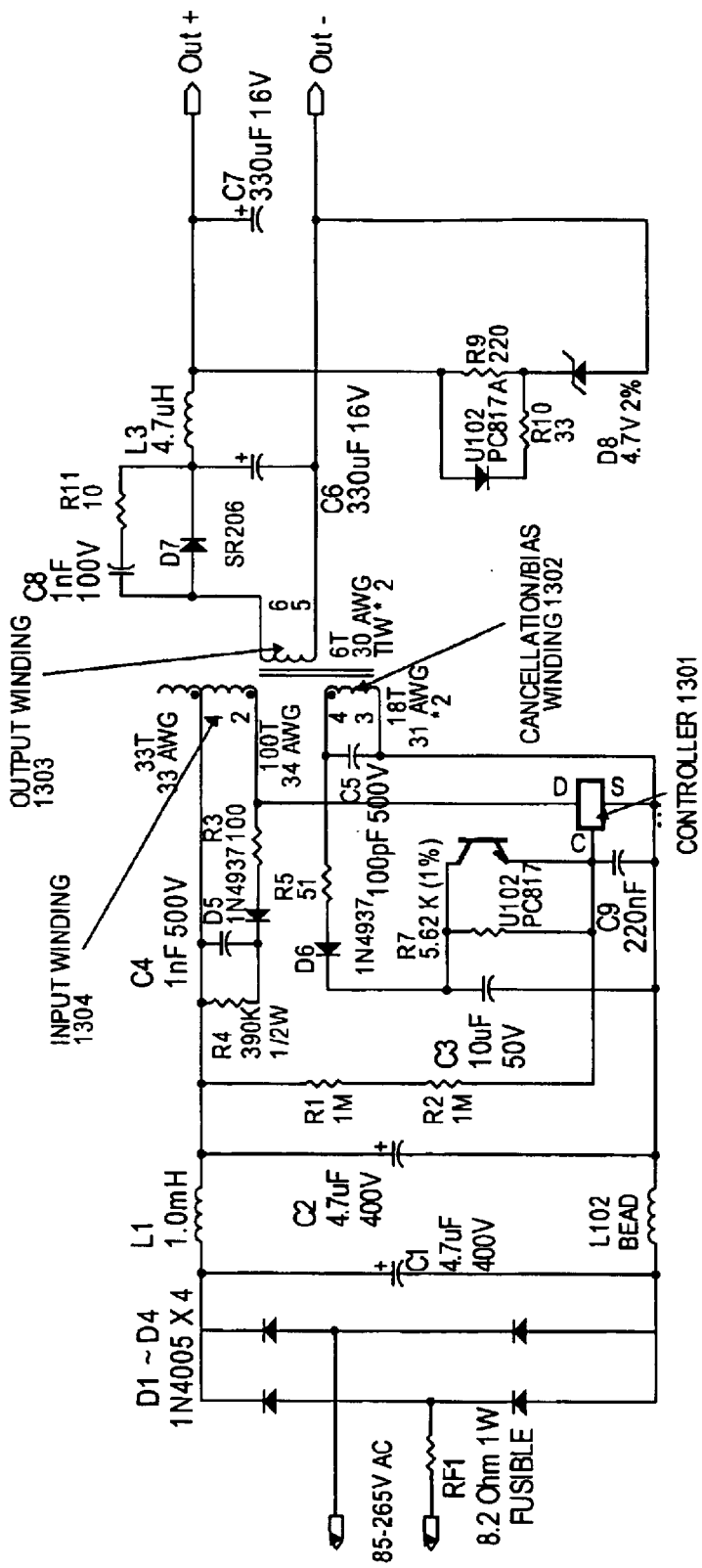
FIG. 13 is a schematic of one embodiment of a power supply utilizing one embodiment of a transformer wound in accordance with the teachings of the present invention.

To illustrate, FIG. 13 shows one embodiment of a specific circuit example of a flyback converter power conversion circuit using the cancellation winding as a bias winding 1302 for the input circuit. It is appreciated that other types of power conversion circuit may employ embodiments according to the teachings of the present invention and the FIG. 13 is provided for explanation purposes. In the illustrated embodiment, the input circuit comprises the circuitry on the primary or input winding side of the power conversion circuit shown. In the illustrated embodiment, the output circuit comprises the circuitry on the secondary or output winding side of the power conversion circuit shown. In one embodiment, the controller 1301 monolithically integrates a switch and control circuitry. Therefore, in the illustrated embodiment, the switch and control circuitry are monolithically integrated as an integrated power supply controller integrated circuit. The control terminal C of controller 1301 receives feedback through components R7 and U102 and also acts as the low voltage power supply for the controller 1301. The current flowing through U102 is governed by the output circuitry of the power supply D8, R9, R10 and U102 LED as will be familiar to one skilled in the art. However, the voltage across capacitor C3 is a function of the bias winding voltage 1302 and therefore the bias winding provides feedback information to the control terminal C of controller 1301 if the optocoupler U102 is not conducting. In this configuration therefore, winding 1302 acts as both a bias winding and also provides feedback information regarding the output of the power supply. The physical position of the cancellation winding 1302 next to the output winding in the construction of the transformer makes it ideal for use as a source of feedback since it tracks the output voltage with minimal influence from the main input winding 1304 which would introduce errors due to the high switching voltage spikes present on this winding.

What is claimed is:

1. An energy transfer element, comprising:
   an input winding to be coupled to an input circuit;
   an output winding to be coupled to an output circuit;
   an electrically conductive shield coupled to the input winding; and
   a first cancellation winding to be coupled through a switch to the input winding only when the switch is closed, the first cancellation winding wound to substantially reduce a net capacitive displacement current between the input circuit and the output circuit.

2. The energy transfer element of claim 1 wherein the electrically conductive shield is physically positioned between input and output windings and the output winding is physically positioned between the electrically conductive shield and the first cancellation winding.

3. The energy transfer element of claim 1 wherein the first cancellation winding is coupled to provide a bias supply for the input circuit.

4. The energy transfer element of claim 1 wherein the input winding, the output winding, the first cancellation winding and the electrically conductive shield are wound around an energy transfer element core.

5. The energy transfer element of claim 4 further comprising a second cancellation winding physically positioned between the energy transfer element core and the input winding, the second cancellation winding wound to substantially reduce a capacitive displacement current flowing between the input winding and the energy transfer element core.

6. The energy transfer element of claim 5 wherein the first and second cancellation windings are wound to substantially reduce a total displacement current flowing between the energy transfer element and electrical earth.

7. The energy transfer element of claim 1 wherein the input and output circuits are comprised in a power conversion circuit.

8. The energy transfer element of claim 7 wherein the power conversion circuit comprises a flyback converter.

9. The energy transfer element of claim 8 wherein the first cancellation winding is coupled to provide feedback information regarding the output of the power supply to the input circuit.

* * * * *